United States Patent [19]
Christensen

[11] 4,097,954
[45] Jul. 4, 1978

[54] FLUTTER-RESISTANT CASTER

[75] Inventor: Carl O. Christensen, Alamo, Calif.

[73] Assignee: Roll-Rite Corp., Oakland, Calif.

[21] Appl. No.: 762,655

[22] Filed: Jan. 26, 1977

[51] Int. Cl.² .............................................. B60B 33/00
[52] U.S. Cl. ...................................... 16/21; 308/215; 16/35 D
[58] Field of Search ........................ 16/20, 21, 24–26, 16/46, 48, 35 D; 308/189 R, 207 R, 215

[56] References Cited

U.S. PATENT DOCUMENTS 2,947,021   8/1960   Black ........................................ 16/21

FOREIGN PATENT DOCUMENTS 946,559   12/1948   France ................................. 308/215

*Primary Examiner*—Dorsey Newton
*Attorney, Agent, or Firm*—Phillips, Moore, Weissenberger, Lempio & Majestic

[57] ABSTRACT

Fluttering of caster wheels having a swivel mechanism including ball-type or roller-type bearings is effectively prevented by substituting, for some of the steel rolling elements of the bearings, resilient rubber-like rolling elements of somewhat greater diameter. Flutter resistance and steering characteristics of the caster can be varied by varying the size of the resilient rolling elements, or the proportion of resilient rolling elements to steel rolling elements in the bearing.

3 Claims, 5 Drawing Figures

FLUTTER-RESISTANT CASTER

BACKGROUND OF THE INVENTION

Inexpensive casters capable of carrying substantial loads and yet allowing free swiveling movement are purposely designed with a great deal of play in their swivel mechanism to cut down on manufacturing costs and to prevent binding of the swivel mechanism. Consequently, these casters have an inherent tendency to flutter when the castered device is pushed in a straight line under light-load or no-load conditions — a noisy and highly undesirable phenomenon.

Fluttering can be avoided, of course, by using precision bearings built to close tolerances, but this is an expensive alternative which is economically unacceptable in most instances. Reduction of the play in the swivel mechanism has been attempted in the prior art by simply loading the bearings at the cone (e.g. by springs or other resilient means), but this did not fully solve the problem because systems of this type tended to allow the fork to tilt so much under load that the bearing balls could roll out of their races.

In those applications where fluttering presents significant noise, maintenance, or safety problems, and where steering control is necessary, solutions such as that of U.S. Pat. No. 3,924,292 have been proposed in special situations. For wide usage of any flutter-eliminating scheme where no steering control is needed, however, a simpler, more universally applicable approach was still needed.

SUMMARY OF THE INVENTION

The invention solves the problem of the prior art, where steering control is not needed, by simply substituting, for some of the steel rolling elements of either or both bearings of the swivel mechanism of the caster, non-cold-flowing resilient rolling elements of somewhat greater diameter.

It is therefore the object of the invention to provide a flutterless caster of the type having a ball or roller bearing in which a plurality of the steel rolling elements are replaced by resilient rolling elements of greater diameter than the steel rolling elements.

This approach attacks the fluttering problem from two directions: first, the resilient rolling elements take up any slack in the bearings and thereby prevent the side rock which causes the wheel to turn back and forth and thus generates the flutter; and secondly, the resilient rolling elements impose a preload of about 1-2 kg. at the wheel axle so as to impede any flutter when it does occur.

BRIEF DESCRIPTION OF THE PREFERRED EMBODIMENT

DESCRIPTION OF THE PREFERRED EMBODIMENT

Figures 1, 2, 3:
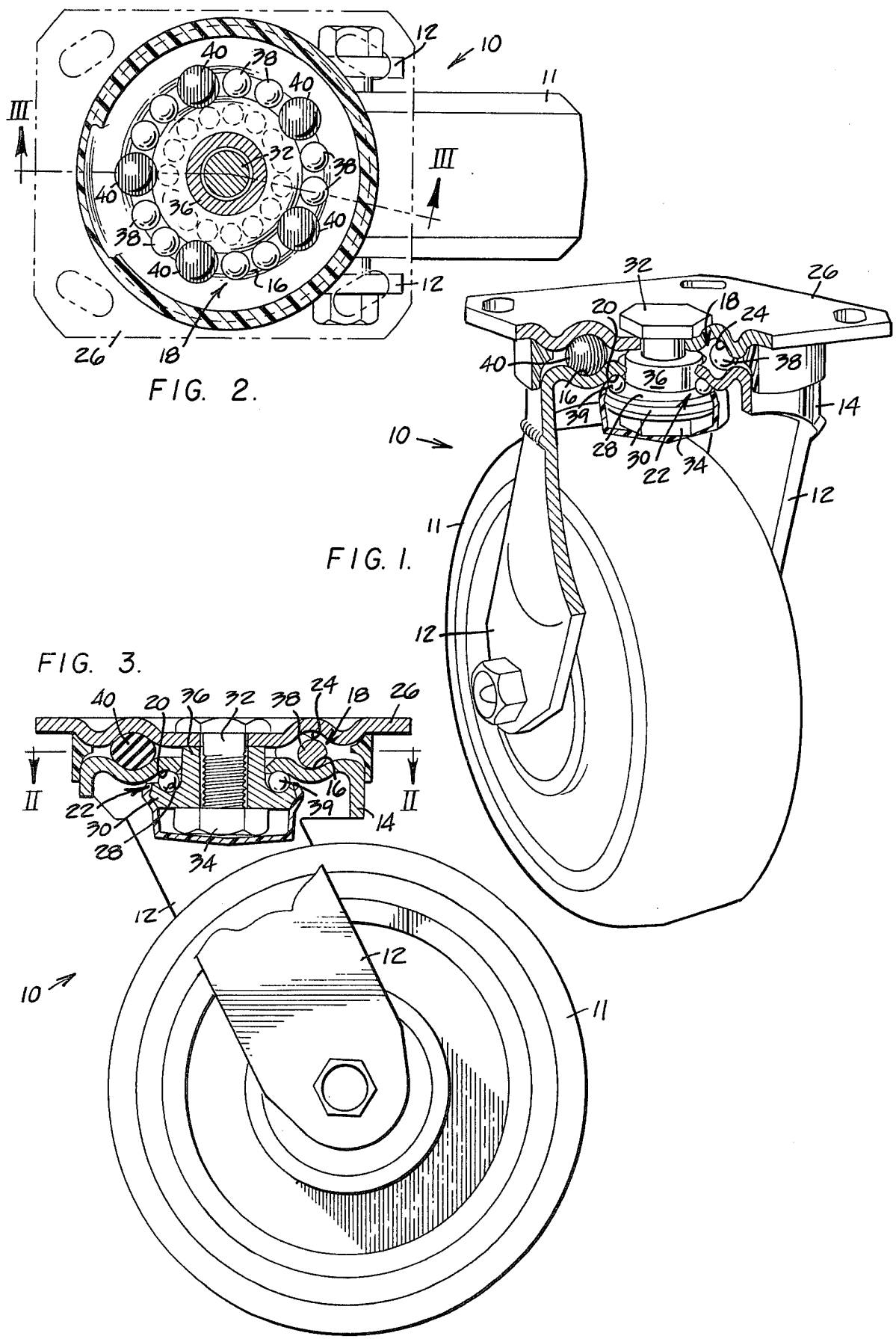
FIG. 1 is a partly cut-away perspective view showing a caster according to this invention.
FIG. 2 is a horizontal section through the thrust bearing of the caster of FIG. 1 showing a preferred arrangement of the steel and resilient balls.
FIG. 3 is a vertical section through the swivel mechanism of the caster of FIG. 1 along the line 3—3 of FIG. 2 showing the relationship of the parts under no-load conditions.

The caster 10 shown in FIG. 1 of the drawings is a conventional caster except for the inventive modification discussed hereinafter. It consists of a wheel 11 rotatably journalled in legs 12 formed integrally (as by stamping or welding) with a cup 14. The cup 14 forms a lower ball race at 16 for the thrust bearing 18, and a upper ball race at 20 for the thrust adjusting bearing 22. The upper ball race 24 of thrust bearing 18 is formed in the mounting plate 26, while the lower ball race 28 of the thrust adjusting bearing 22 is formed in the cone 30 which is rigidly attached to the mounting plate 26 by the king pin 32 and nut 34.

Because of the need for practical manufacturing tolerances and the need for the caster 10 to swivel freely, conventional casters are designed to have a significant amount of play in the swivel mechanism composed of thrust bearing 18 and thrust adjusting bearing 22. To put it another way, the shank 36 of cone 30 is so proportioned that when the wheel assembly hangs from the mounting plate 26 in the no-load condition, the steel balls of the thrust bearing 18 contact only the lower race 16 and are slightly spaced from the upper race 24. In that condition, the wheel-supporting cup 14 is free to swivel (and flutter) on thrust adjusting bearing 22.

In accordance with the invention, some of the steel balls 38, 39 of either or both bearings 18, 22 may be replaced with resilient balls 40, 41 of a non-cold-flowing elastic material such as, for example, Buna-S syntehtic rubber. The resilient balls 40 or 41 are of a larger diameter than the steel balls 38 or 39, of the corresponding bearing, sufficiently large to be compressed into a slightly elongated, somewhat roller-shaped form even when the wheel-and-cup assembly is hanging from the mounting plate with no load applied. However, even though compressed, the balls 40, 41 are still rolling elements which operate without frictional drag.

Although three resilient balls 40 or 41 in a given bearing are theoretically sufficient to practice the invention, a minimum of four is usually advisable in practice. As a practical matter, however, it is desirable to use as few resilient balls 40, 41 as will provide sufficient turning resistance (preferably about 1-2 kg. at the axle of the caster wheel in a typical embodiment) without impairing the caster's load-carrying capacity. The optimum number of resilient balls 40, 41 used is dependent upon the size and characteristics of the bearing involved.

In operation, all of the resilient balls 40, 41 are compressed and deformed about equally in the no-load condition of the inventive caster. In this condition, the resilient balls 40, 41 hold the wheel-and-cup assembly against wobbling due to the play originally designed into the bearings, and effectively bias the bearings into the position in which they are meant to operate. When an uneven or intermittent ground contact of the caster during straight-line travel of the castered object under no-load or light load conditions attempts to throw the swivel mechanism into fluttering oscillations, the swiveling motion of the caster causes the resilient balls 40, 41 to roll in their races.

Inasmuch as the balls 40, 41 are always compressed in the no-load condition and are therefore out of round, a rolling motion causes them to distend at previously compressed portions of their surface, and to become compressed at previously distended portions of their surface. The resulting continuous change of shape of each resilient ball as it rolls along its race consumes energy which manifests itself as a resistance or pre-load of the swiveling mechanism against any swiveling motion. This pre-load is preferably only no more than a few kilograms, even for a large caster, but it is enough to prevent the caster from fluttering.

Figure 4:
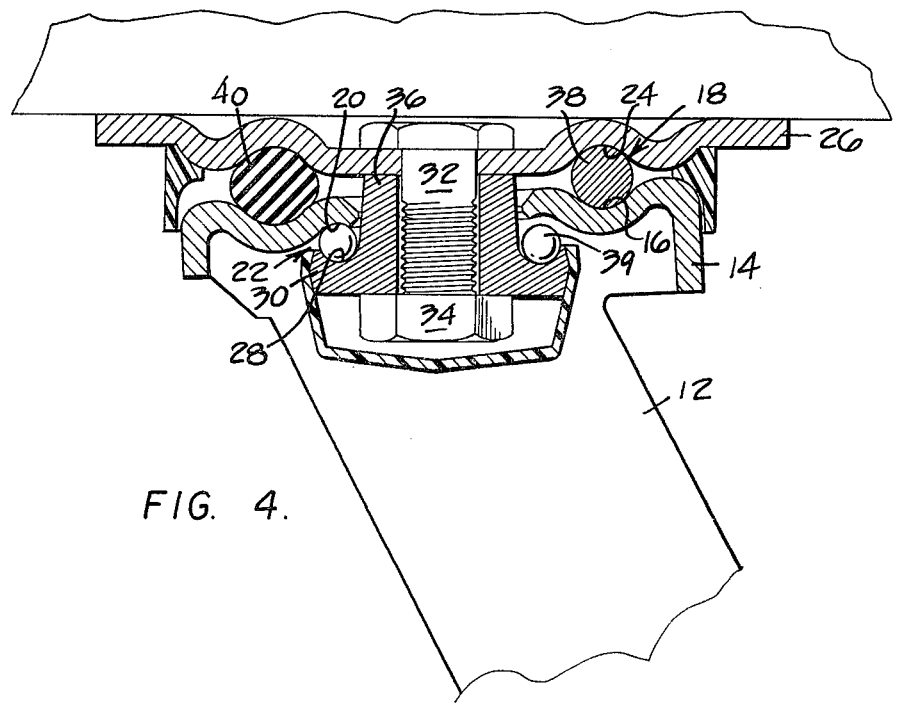
FIG. 4 is a vertical section similar to FIG. 3 but showing the relationship of the parts under load conditions.

When the caster is loaded (FIG. 4), the resilient balls 40 are compressed further along most of the circumference of bearing 18 until the races 16, 24 of both the cup 14 and the mounting plate 26 contact the steel balls 38 on the right side of bearing 18 in FIG. 4 (due to the eccentricity of wheel 11 with respect to the swivel mechanism), and cause the bearing 18 to operate as a conventional ball bearing which, under load, does not flutter but swivels only when the caster is purposely turned. The deformation resistance of resilient balls 40 still exists of course, and is in fact slightly increased in this condition, but the force required to turn the caster under full load is so large that the preload caused by the resilient balls 40 is insignificant by comparison. Thus, the anti-flutter feature of this invention is not noticeable in the full-load operation of the caster. Because of the fact that the resilient rolling elements have a slight "give," the caster of this invention steers easily and without dead drag.

Figure 5:
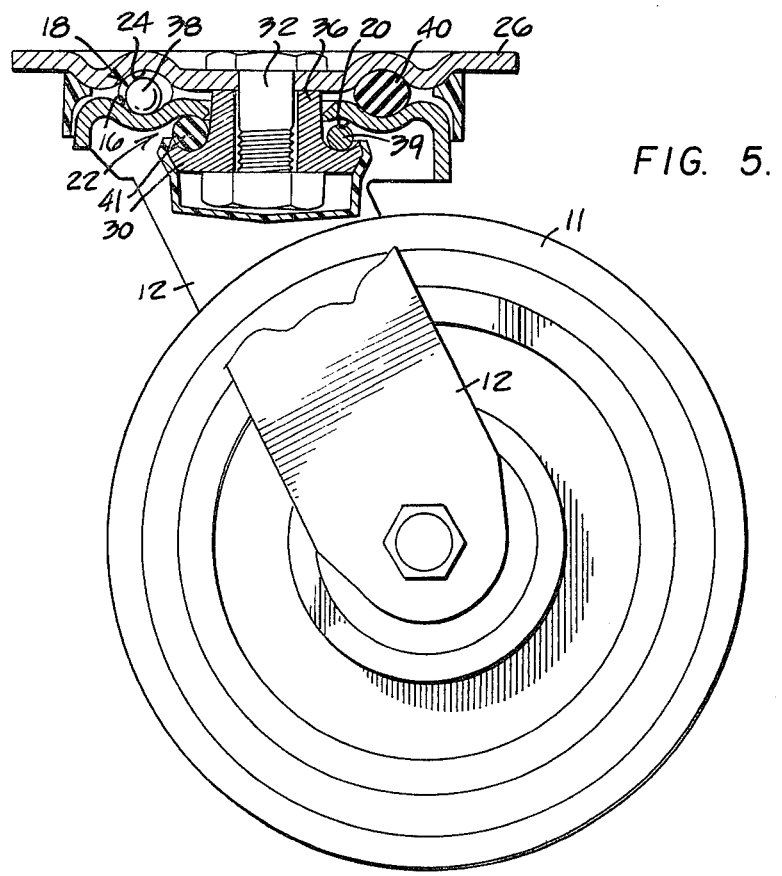
FIG. 5 is a vertical section similar to FIG. 3 but showing a caster with resilient balls in both races.

It will be noted that the resiliency of the balls 40, 41 makes them self-adjusting in the vertical direction in FIGS. 3–5 to compensate not only for the variation in the race spacing when the fork 12 tilts under load, but also for any wear of the bearing races and the steel balls. Consequently, looseness or play in the bearings is effectively prevented.

The amount of pre-load (which is a constant for any given caster) caused by the resilient balls, as well as the characteristics of the swivel mechanism as a whole, can be varied by varying the size of the resilient balls in proportion to the steel balls of their respective bearing or bearings. These factors can also be varied by changing the number of resilient balls, or by adding resilient balls to the thrust bearing alone, to the thrust adjusting bearing alone, or to both.

Although the invention has been described herein in terms of the most common type of bearings which have spherical balls as their rolling elements, it will be readily understood that the same considerations apply in the same manner to bearings whose rolling elements are of another shape, e.g. radially disposed rollers.

I claim:
1. A flutter-resistant caster comprising:
   (a) mounting means for attaching said caster to an object to be castered;
   (b) wheel-supporting means pivotally supported on said mounting plate;
   (c) wheel means rotatably supported on said wheel-supporting means; and
   (d) bearing means interposed between said mounting means and said wheel-supporting means, said bearing means including a plurality of solid hard rolling elements adapted to roll between a pair of races mounted for limited movement toward and away from each other between a first position where said races are spaced from one another by a distance substantially greater than the diameter of said hard rolling elements, and a second position where said races are sufficiently close to each other so that at least some of said hard rolling elements are rollingly engaged by both of said races;
   (e) said bearing means further including, between at least some of said hard rolling elements, a plurality of solid resilient rolling elements of similar shape but greater diameter, said resilient rolling elements being arranged to bias said races into said first position;
   (f) the compressibility and diameter of said resilient elements being such that under no-load conditions, they impose a sufficient pre-load upon said bearing means to impede fluttering of said caster, and that under load conditions, the load is borne essentially by said hard rolling elements without substantial interference by said resilient elements.
2. The caster of claim 1, in which said bearing means are ball bearing means, said hard elements are steel balls, and said resilient elements are balls of a non-cold-flowing, rubberlike material.
3. The caster of claim 2, in which said bearing means include a pair of bearings each of which has one of its races formed on said wheel-supporting means, and in which said resilient balls are interposed between at least some of said steel balls in each of said bearings.